No. 741,089. PATENTED OCT. 13, 1903.
H. H. YOUNG.
REDUCING GEAR.
APPLICATION FILED DEC. 31, 1902.
NO MODEL.
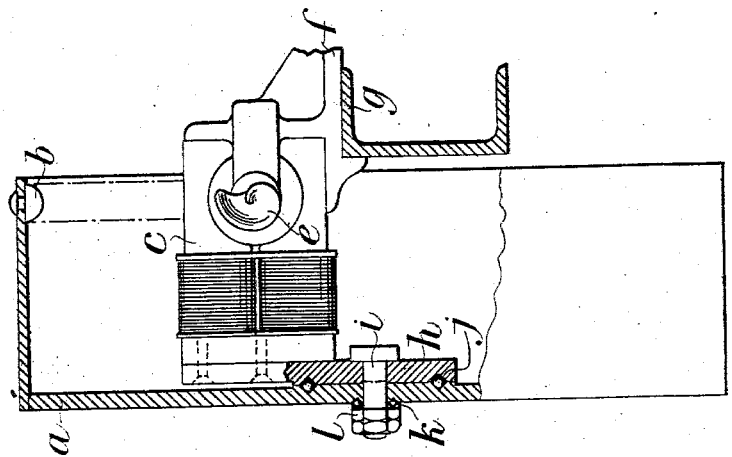
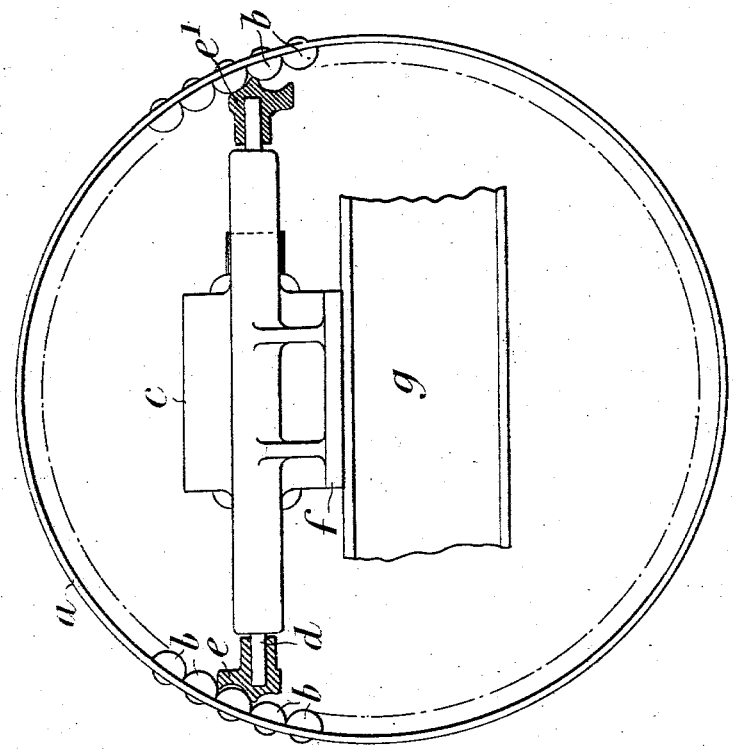
Witnesses
Inventor No. 741,089.

Patented October 13, 1903.

UNITED STATES PATENT OFFICE.

HARRY HOWLETT YOUNG, OF COLCHESTER, ENGLAND.

REDUCING-GEAR.

SPECIFICATION forming part of Letters Patent No. 741,089, dated October 13, 1903.

Application filed December 31, 1902. Serial No. 137,320. (No model.)

*To all whom it may concern:*

Be it known that I, HARRY HOWLETT YOUNG, lieutenant-colonel Indian staff corps, a subject of the King of Great Britain, residing at 10 Inglis road, Colchester, in the county of Essex, England, have invented new and useful Improvements in Reducing-Gear, of which the following is a specification.

This invention relates to improvements in reducing-gear for transmitting rotary motion, and has for its object to provide a gear of higher efficiency than those heretofore in use which is suitable for motors of small energy and which can be easily adjusted to compensate for wear.

According to the invention I construct my improved gear of a disk, wheel, or the like, within which is located the motor the motion of which is to be transmitted at a reduced speed to the disk or wheel. The axis of the shaft of the said motor is parallel to the plane of the face of the disk and its motion is communicated to the disk, or wheel by means of a one-turn snail upon its end, which engages teeth, serrations, or the equivalent upon the inner face of a peripheral flange of the wheel or disk.

In the accompanying drawings, Figure 1 is a side elevation of a suitable form of gear constructed according to the invention, and Fig. 2 is a sectional end elevation thereof.

$a$ is the disk or wheel, and $b$ $b$ are studs forming the teeth around the inner face of its peripheral flange. It will be understood that I do not limit myself to the use of teeth formed in this way, although I have found such teeth to give good results in practice.

$c$ is the motor, the power of which is to be transmitted. I have here shown an electromotor; but any other suitable type of motor can be employed where desired. $d$ is the shaft of the said motor, the said shaft being, as is clearly shown, arranged with its axis parallel to the plane of the face of the wheel $a$. It will be understood that the shaft $d$ of the motor is secured to and rotates with the armature of the electromotor.

$e$ is the one-turn snail or worm, which is mounted upon one end of the shaft $d$ and which engages the studs $b$ $b$ upon the internal periphery of the wheel $a$. This snail, as will be evident, when rotated by the motor transmits its motion to the wheel at a greatly-reduced speed. In practice the worm is made adjustable axially on the shaft $d$ to enable wear of the working face to be compensated for. In the present case the worm is bored out and fitted upon one end of the shaft $d$, being held adjustably thereon by a set-screw which does not appear in the sectional drawings.

The frame or bed-plate $f$ of the motor $c$ is bolted to the support $g$, and the disk or wheel $a$ is secured to a plate $h$ on the motor by means of the bolt $i$, which forms the pivot around which the wheel $a$ turns. Ball-bearings $j$ and $k$, respectively, are provided between the disk $a$ and plate $h$ and the disk and nut $l$ upon the bolt $i$. I may, if desired, mount a second and similar snail $e'$ upon the other end of the shaft $d$, set at half a turn in advance of the first snail. The employment of this second snail has for its object to obtain a more even and balanced transmission than is given by the use of one snail only.

It will be apparent from an examination of the drawings that as the shaft $d$ of the motor is rotated the spiral grooves of the worms or snails will engage the teeth or projections on the interior of the rim of the wheel successively and cause the latter to revolve at a much lower speed than that of the shaft itself.

Having now particularly described and ascertained the nature of my said invention and in what manner the same is to be performed, I declare that what I claim is—

1. The combination with a wheel having the interior face of its rim provided with teeth, of a motor located within the circumference of the wheel, and provided with a driving-shaft arranged parallel with the lateral faces of said wheel, and a snail on said shaft engaging the teeth of said wheel, substantially as described.

2. The combination with a motor, of a flanged wheel mounted on the frame of the motor and having teeth on the interior face of its flange, said motor having a driving-shaft arranged parallel to the lateral faces of said wheel, and a one-turn snail on each end of said shaft engaging the teeth of said wheel, one of said snails being set on the shaft in advance of the other, substantially as described.

HARRY HOWLETT YOUNG.

Witnesses:
C. G. REDFERN,
A. ALBUTT.